Feb. 9, 1954     OLOF-EINAR LARSSON     2,668,573
APPARATUS AND PROCESS FOR CORRUGATING PAPER
Filed March 9, 1948     2 Sheets-Sheet 1
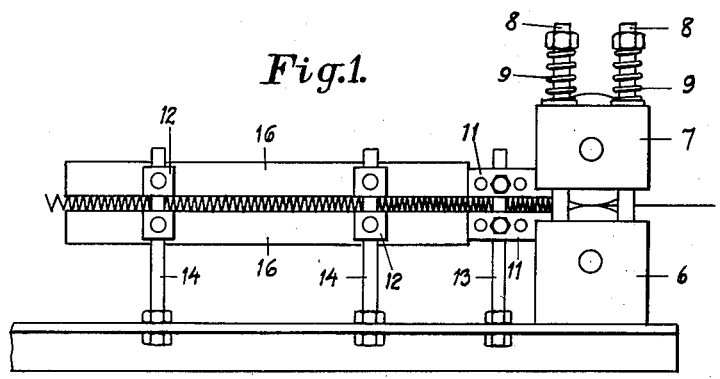
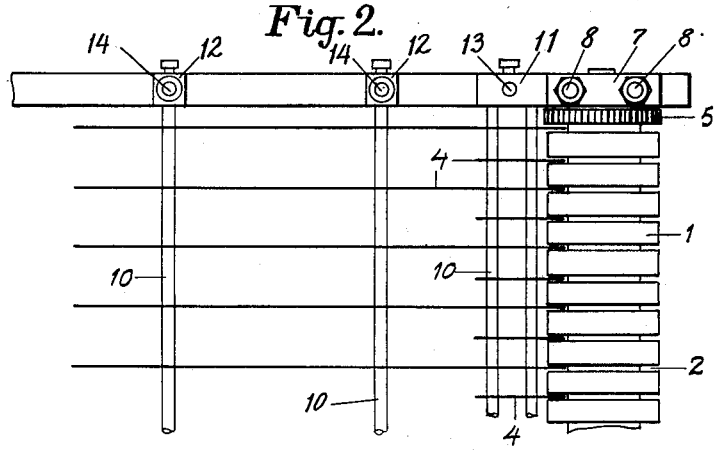
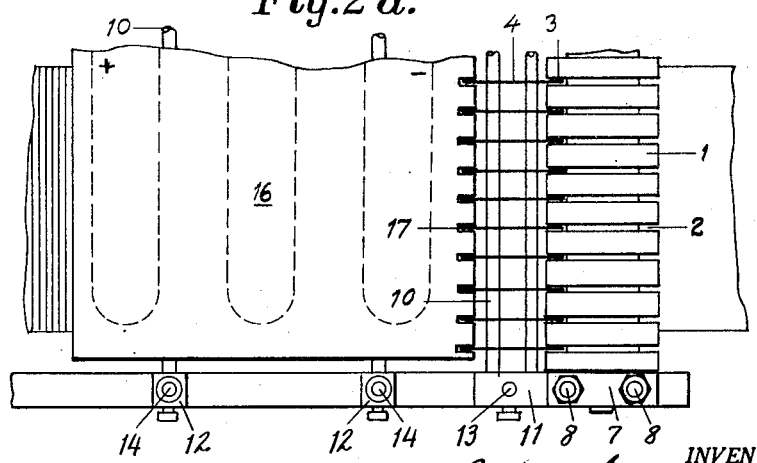
INVENTOR.
Olof Einar Larsson
BY
Robert S. Dunham
ATTORNEY Feb. 9, 1954     OLOF-EINAR LARSSON     2,668,573
APPARATUS AND PROCESS FOR CORRUGATING PAPER
Filed March 9, 1948     2 Sheets-Sheet 2
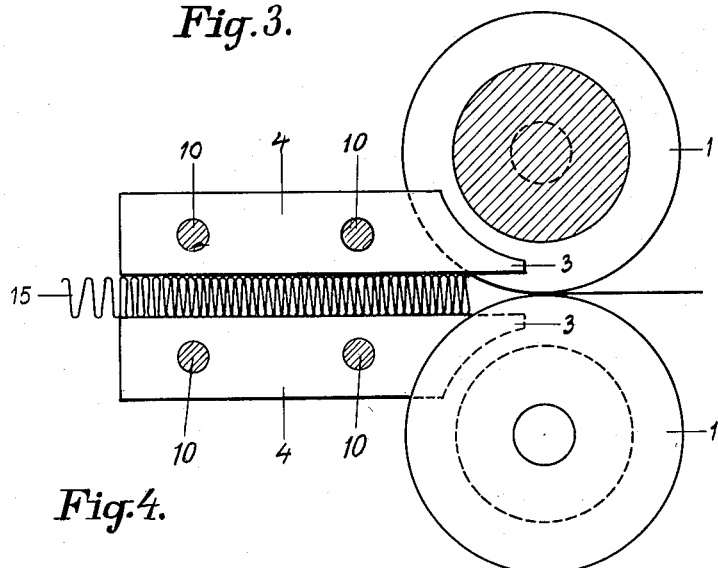
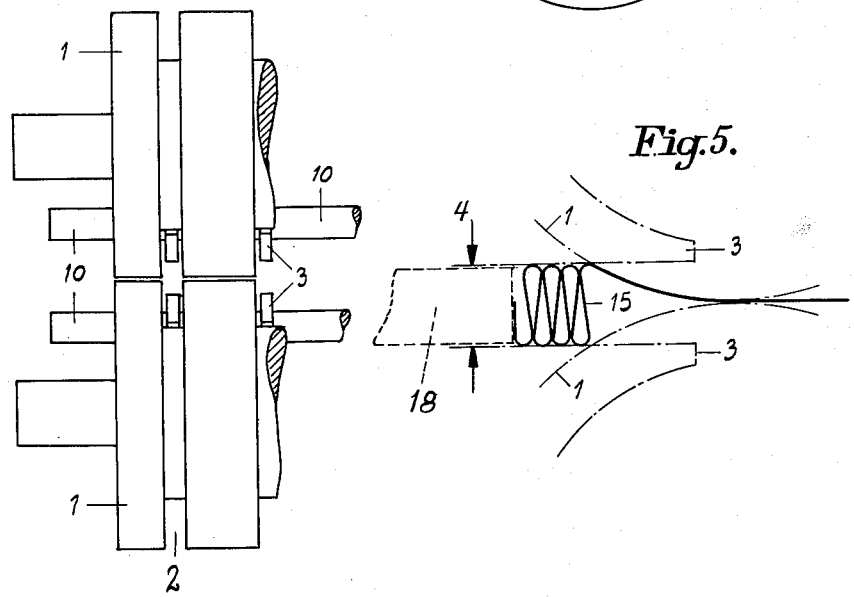
INVENTOR.
Olof Einar Larsson
BY
Robert S. Dunham
ATTORNEY Patented Feb. 9, 1954

2,668,573

UNITED STATES PATENT OFFICE 2,668,573

APPARATUS AND PROCESS FOR CORRUGATING PAPER

Olof Einar Larsson, Orebro, Sweden

Application March 9, 1948, Serial No. 13,824

Claims priority, application Sweden April 8, 1947

6 Claims. (Cl. 154—30)

In the manufacture of corrugated paper it is usual to use machines with axially grooved rollers, between which the material passes and corrugations are impressed therein by the surfaces of the rollers. With such grooved rollers the material will always be damaged between the grooves and be more or less impaired and lose its consistency.

In the manufacturing method described below use is made of smooth rollers, without axial grooves, and the material will pass between them without being deformed or damaged. The corrugation is brought about in a simple way, without the material being roughly pressed in between roller surfaces gearing into each other like cogs. The smooth cylindrical rollers convey the material into a channel between two parallel surfaces, whose spacing corresponds to the heights of the finished waves. The forming of the waves is brought about in such a way that, when the machine is started, a stopping device or an obstacle for the passage of the material is introduced across the channel near the rollers. In this way the material fed in by the rollers will be impeded in its movement and begins to corrugate to a thickening parallel with one of the rollers. When this has grown so large that its friction against the walls of the channel is great enough to offer the resistance that is needed for the corrugation of the material, the obstacle or the stopping device arranged at the start of the manufacture is removed and the corrugated material glides further along the channel, according as the corrugated material is new-formed.

During experiments with a machine employing the present invention it has proved advantageous to work with material dampened to a suitable extent, which having passed the feeding rollers and reached the channel described and at the beginning of this having received its characteristic corrugated form, will advance onward between rulers or plates, which have been warmed or heated to a suitable extent. In this way the ridges of the waves or the tops of the corrugations, which glide along the warm surfaces, will first be dried up or, as it were, made permanent. The corrugations brought about in this way are so close together that adjacent tops or ridges touch or nearly touch one another. They can later be fixed in this state by the aid of a suitable binding-medium. For the warming of the rulers or plates electric or other energy can be used.

The devices used for corrugating the material and making it permanent are shown on the attached drawings in two forms chosen as examples, which may, however, be further varied to a great extent. Fig. 1 shows the machine from the side and Fig. 2 from above with the walls of the channel formed of rulers placed on their edges and suitably distributed, while Fig. 2a shows the device with the walls of the channel formed of flat faced slabs or radiators, which may be composed of broken-through sections. Fig. 3 shows a detail of the corrugating device and indicates how the material coming from the rollers alternates zigzag between the upper and the lower boundary. Fig. 4 shows a detail of the rollers and the ends of the rulers, as seen from the feeding-side. Fig. 5 shows the course of the corrugation on a somewhat larger scale.

The machine consists of two rollers 1, which, in the form shown, are provided with a number of peripheric grooves 2 equally spaced axially of the rollers and which provide spaces for accommodating the ends 3 of the steering rulers 4. In order that the movement may be simultaneous the rollers 1 are connected by toothed wheels 5, and they are supported in bearings. The bearing 7 is guided by bolts 8 and is pressed towards the bearing 6 by springs 9. The rulers 4 are supported by rods 10, fixed in guides 11, 12, which are adjustable on uprights 13, 14. The adjustability is arranged in order that the distance between the edges of the rulers directed to the channel may be changed. The object of this is to give the waves or the ridges the height desired, because the heights of the waves will be equal to the distance between the edges of the rulers.

Instead of rulers for regulating the heights of the ridges, plates or slabs of a suitable kind may be used. Also cloths or felt, stretched over rolls and put in feeding movement by these, can be used.

The material corrugated in the way described is sized in the known way on one or more paper sheets or something similar. As a consequence the height of the waves is fixed in such a way that the corrugated material is fed out of the channel at a speed which has a certain relation to the speed at which the corrugation is brought about near the rollers 1. If these speeds are the same, the product will be very firm and compact. As illustrated in Fig. 5, the adjacent bends which contact with the upper surface of the channel extend through more than 180° and contact one another, and the same is true with respect to the bends along the lower surface of the channel. This is a compact arrangement in which the corrugations are formed with at least four successive corrugations within a distance as great as the height of the channel.

Since the rollers are smooth and have no axial corrugations, they can be run cold without the material being damaged in the folds. Paper and things like that can therefore be treated with water glass or resinous substances before the corrugation, because these substances do not burn in on cold rollers.

The adjustment of the rollers or the radiators is brought about by means of co-ordinate screws, levers or eccentrics. According to the form shown in Fig. 2a the walls of the channel consist partly of short rulers 3, 4, and partly of heating plates or radiators 16. The movement of the corrugated sheet over the joint between the radiators and the rulers is brought about in the same way as between the rollers 1 and the rulers, i. e. the radiators are provided with notches 17, into which the ends of the rulers remote from the rollers extend, so that the passage of the material may not be impeded by the joint.

The rollers 1 advance the sheet of material into the channel formed by parallel guides, i. e. the rulers 4, or the heating plates 16, and into contact with a stopping device which is temporarily introduced in the path of travel of the material. This stopping device may assume any suitable form, such as a bar 18, Fig. 5. The bar 18 serves to stop the advance of the forward portion of the material until a thickening has been formed which will provide sufficient friction against the walls of the channel to offer the resistance needed for the forming of the corrugations 15. After this has occurred the bar is removed so that corrugations may continue to be formed as the rollers advance the material against the resistance caused by the friction of the corrugations on the walls of the channel.

The slabs as well as the rulers may be provided with heating devices. If the use of the rulers 4 is not desired, the heating plates can, at the edge adjacent to the rollers, be provided with projections like the ends 3 of the rulers, which extend into the grooves of the rollers. These projections may continue on the plates in the direction of the rulers as long parallel guides, which form the boundary of the channel and facilitate the finishing of the surfaces in the manufacture of the machine.

The rollers need not, like the form shown in Fig. 1, have equal diameters, but their periphery speeds are to be the same. Neither is it necessary to couple the rollers by gearing; it is also possible to convey power to one roller only.

What is claimed is:

1. A process for producing regular corrugations in a strip of flat paper comprising continuously feeding a strip of paper edgewise and midway between parallel guides and causing the strip of paper alternately to bend transversely thereof into regular corrugations with alternate corrugations bearing against opposite parallel guides by temporarily impeding the advance of the forward edge of the strip of paper while continuing the feeding of the strip of paper, and discontinuing the temporary impeding of the advance of the forward edge of the paper when a sufficient number of corrugations have been formed to provide frictional drag between the ridges of the formed corrugations and the parallel guides to continue the forming of successive regular corrugations bearing upon the parallel guides as the strip is feeding into the space between the parallel guides and the corrugated paper advances therealong.

2. The process set forth in claim 1 in which the strip of flat paper is dampened before entering the space between the parallel guides, and the formed corrugations are heated while advancing between the guides.

3. In apparatus for forming regular corrugations in a strip of flat paper, the combination comprising a pair of feeding rollers, said rollers having substantially smooth peripheries for feeding a flat strip of material therebetween, and a channel including opposing guides located in planes parallel to and equally spaced at opposite sides of a plane tangentially to said rollers and passing through the paper-feeding bite of said rollers, said guides extending into circumferential grooves in said rollers and defining surfaces of said channel intersecting said rollers along generatrices of said rollers, said surfaces being spaced from each other sufficiently to form corrugations in the flat paper with alternate ridges contacting opposite surfaces of said guides.

4. Apparatus as set forth in claim 3, in which means are provided for heating the surfaces of the guides.

5. In apparatus for forming regular corrugations in a strip of flat paper, the combination comprising a pair of feeding rollers, said rollers having substantially smooth peripheries for feeding a flat strip of material therebetween, a pair of heating plates spaced from one another and providing a channel therebetween with parallel walls, the walls of said channel being equally spaced at opposite sides of a plane tangential to said rollers and passing through the paper-feeding bite of said rollers, a plurality of rails intermediate said rollers and said heating plates, said rails having guiding edges in prolongation with said walls and extending into slots in said walls and into circumferential grooves in said rollers, the guiding edges of said rails intersecting generatrices of said rollers spaced apart equal to the spacing between said parallel walls of said heating plates.

6. In apparatus for forming regular corrugations in a strip of flat paper, the combination comprising a pair of feeding rollers, said rollers having substantially smooth peripheries for feeding a flat strip of material therebetween, and a channel including opposing guides located in planes parallel to and equally spaced at opposite sides of a plane tangentially to said rollers and passing through the paper-feeding bite of said rollers, said guides extending into circumferential grooves in said rollers and defining surfaces of said channel intersecting said rollers along generatrices of said rollers, said surfaces being spaced from each other sufficiently to form regular corrugations in the flat paper with alternate ridges contacting opposite surfaces of said guides, and a blocking device positionable across said channel for temporarily stopping the advance of corrugated paper through said channel and removable from said channel.

OLOF EINAR LARSSON.

References Cited in the file of this patent

UNITED STATES PATENTS

| Number | Name | Date |
|---|---|---|
| 2,141,235 | Angeletti | Dec. 27, 1938 |
| 2,311,174 | Hitt | Feb. 16, 1943 |
| 2,409,997 | Straubel | Oct. 22, 1946 |
| 2,410,189 | Straubel | Oct. 29, 1946 |
| 2,500,690 | Lannan | Mar. 14, 1950 |
| 2,513,777 | Andre | July 4, 1950 |

FOREIGN PATENTS

| Number | Country | Date |
|---|---|---|
| 364,381 | Germany | Nov. 23, 1922 |